UNITED STATES PATENT OFFICE.

JOHN J. DUNNE, OF PHILADELPHIA, PENNSYLVANIA.

PROCESS OF MAKING PHOSPHATES.

SPECIFICATION forming part of Letters Patent No. 345,625, dated July 13, 1886.

Application filed October 10, 1885. Serial No. 179,524. (No specimens.)

*To all whom it may concern:*

Be it known that I, JOHN J. DUNNE, a citizen of the United States, residing in Philadelphia, Pennsylvania, have invented certain Improvements in the Manufacture of Fertilizers, of which the following is a specification.

My invention consists of an improved process of manufacturing fertilizers from natural or manufactured phosphates, the main object of my invention being to cheapen the production of fertilizers containing soluble and reverted or available phosphoric acid from natural or manufactured phosphates of alumina, phosphates of iron, and phosphates of lime, or combinations thereof. This object I attain by treating such phosphates with alkali or alkaline salts—such as alkaline sulphates or carbonates—in the proportions hereinafter fully set forth.

By the term "soluble," as applied to phosphoric acid, is meant such as is soluble in water, while by the term "reverted" is meant such as is soluble in ammonia citrate.

Taking phosphate of alumina, as an example, for treatment, it may be noted that it contains as a commercial standard about thirty-five per cent. of phosphoric acid, although this proportion may vary to some extent. Taking this percentage of phosphoric acid in the phosphate, as an instance, I add to one hundred parts, by weight, of such phosphate, from six to fourteen parts, by weight, of pure sulphate of potash, or seven to fifteen parts of sulphate of potash of ninety per cent. To the above are added from fifty-two to ninety-four parts of sulphate of soda of ninety-six per cent. The same proportions are observed according to the strength of phosphate and the purity of the alkaline sulphate. The potash not only serves as a solvent for the phosphate, but its employment also introduces into the product the amount of potash necessary for fertilizing purposes. The roasting action hereinafter described has the effect of converting the sulphate of potash into phosphate of potash, and so making it more valuable as a fertilizer. In the ordinary fertilizers the potash is mechanically added in the form of sulphate of potash. The total alkali used should never be less than the minimum or greater than the maximum quantity given. In other words, to the one hundred parts of phosphate of the above standard of phosphoric acid the total alkaline sulphate may vary from about fifty-eight to one hundred and eight parts; or, to put it more generally, there should be from about one-half to an equal part of alkaline sulphate in proportion to the phosphate of alumina containing thirty-five per cent. of phosphoric acid. Where alkalies or alkaline carbonates are used, similar proportions will prevail according to their chemical equivalents. Where the percentage of phosphoric acid contained in the phosphate is less, the amount of alkali employed is proportionately less.

If too large a proportion of alkali is added, the fertilizing value of the product will be reduced by the noxious action of the excess of the alkaline salts on the plants or crops, while if too small a proportion of alkali is used the proportion of soluble or reverted phosphoric acid obtained will be too small to make it commercially available.

To the mixture of phosphates and alkaline sulphates above described there is to be added coal or other form of carbon, so far as necessary to decompose the sulphates, generally about half the weight of the sulphate used. The mixture is then roasted at a very high temperature, just below the point of fusion, in a reverberatory or other suitable furnace until the insoluble phosphoric acid in the phosphate is converted into soluble or reverted phosphoric acid.

By using alkalies in the proportions set forth, without the use of any acids, the process of converting phosphates into available fertilizers is cheapened, and the yield, as well as the fertilizing value of the product, is increased.

I claim as my invention—

1. As an improvement in the manufacture of fertilizers from natural or manufactured phosphates, the mode herein described of converting the insoluble phosphoric acid therein into soluble or reverted phosphoric acid by mixing alkalies or alkaline salts with the phosphates in the proportion of from about one-half to an equal part of alkaline salt to the quantity of phosphate, and furnacing the mixture at a high temperature, substantially as described.

2. The herein-described process of manufacturing fertilizers from phosphates, said mode consisting in mixing the phosphate with alkaline sulphates and carbon in the proportions set forth, and furnacing the mixture at a high temperature, as described.

3. The herein-described process of manufacturing fertilizers from phosphates, said mode consisting in mixing the phosphate with sulphate of soda and sulphate of potash in about the proportions set forth, and furnacing the mixture at a high temperature in conjunction with carbon, as described.

In testimony whereof I have signed my name to this specification in the presence of two subscribing witnesses.

J. J. DUNNE.

Witnesses:
 JOHN E. PARKER,
 HARRY SMITH.